No. 12,452. REISSUED FEB. 13, 1906.

J. F. FERRY.

COOKING UTENSIL.

APPLICATION FILED JUNE 30, 1904.

Witnesses

Otto E. Hoddick.

Dena Nelson.

James F. Ferry.

Inventor by [illegible]

Attorney

UNITED STATES PATENT OFFICE.

JAMES FRANCIS FERRY, OF LEADVILLE, COLORADO.

COOKING UTENSIL.

No. 12,452. Specification of Reissued Letters Patent. Reissued Feb. 13, 1906.

Original No. 711,841, dated October 21, 1902. Application for reissue filed June 30, 1904. Serial No. 214,770.

*To all whom it may concern:*

Be it known that I, JAMES FRANCIS FERRY, a citizen of the United States, and a resident of Leadville, in the county of Lake and State of Colorado, have invented a new and Improved Cooking Utensil, of which the following is a full, clear, and exact description.

This invention relates to improvements in casings for holding cooking utensils, such as kettles, frying-pans, or the like, the object being to provide a simple means for conducting the odors of the cooking food into the stove.

I will describe a cooking utensil embodying my invention and then point out the novel features in the appended claims.

Reference is to be had to the accompanying drawings, forming a part of this specification, in which similar characters of reference indicate corresponding parts in all the figures.

Figure 1:
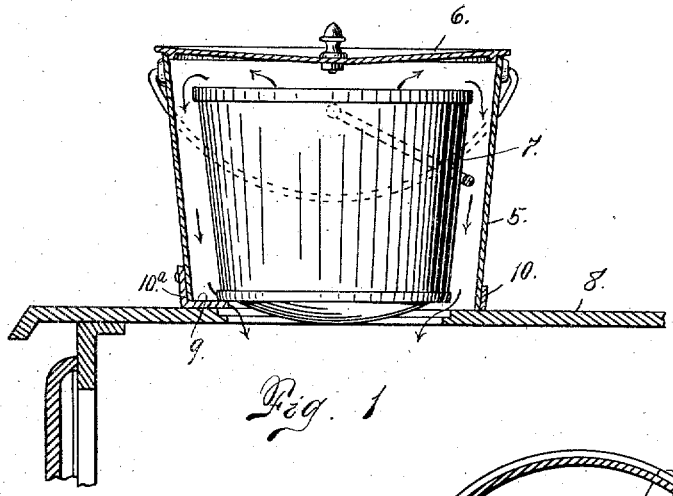
Figure 3:
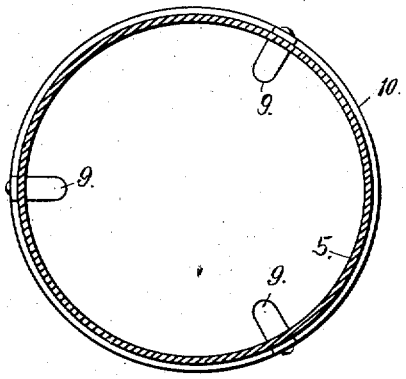
Figure 2:
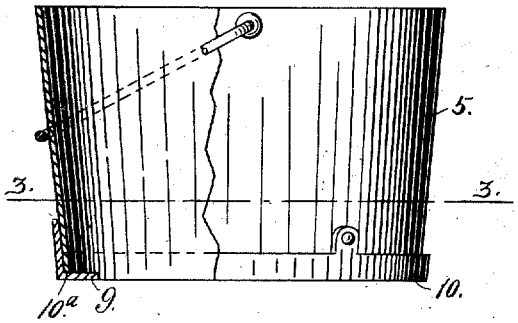
Figure 4:
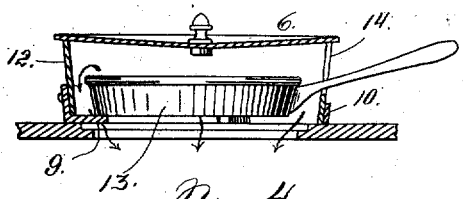
Figure 5:
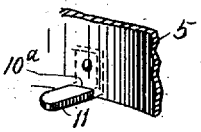

Figure 1 is a sectional elevation of a casing, embodying my invention and showing a kettle or pot therein. Fig. 2 is an elevation, partly in section, of the casing. Fig. 3 is a section on the line 3 3 of Fig. 2. Fig. 4 is a section showing the device as adapted for a frying-pan, and Fig. 5 is a fragmentary view showing a modification.

Referring to the drawings, 5 designates the casing of any suitable metal, open at the bottom and having a cover 6. This casing is designed to receive a kettle or pot 7, which is placed over the opening in the stove-top 8. Extended inward at the bottom of the casing 5 are lugs 9, on which the cooking vessel is designed to rest, raising the same slightly above the top of the stove, so that fumes may pass underneath the same and through the lid-opening of the stove.

In Figs. 1, 2, and 3 I have shown the lugs 9 as extended from a band 10, secured to the bottom of the casing at the outer side. In Fig. 5, however, I have shown a lug 11 secured directly to the bottom of the casing at the outer side. In either event the bottom edge of the casing will be provided with recesses $10^a$ to receive the lugs, so that the extreme bottom edge of the casing will be on a plane with the lower sides of the lugs, thus permitting the casing to rest snugly on the stove-top.

In Fig. 4 I have shown a casing 12 that is in most respects similar to the casing first described. It is, however, much shorter, as it is only designed to receive a frying-pan 13. At one side the casing 12 has an opening 14, through which the handle of the frying-pan may pass.

Having thus described my invention, I claim as new and desire to secure by Letters Patent—

1. In a cooking utensil, a casing adapted to receive a cooking vessel, a cover for said casing and entirely closing the top thereof, the casing being open at the bottom, and lugs extended inward at the bottom and secured to the outer side of the casing, the lower surfaces of said lugs being on a plane with the bottom edge of the casing, substantially as specified.

2. In a cooking utensil, a casing adapted to receive a cooking vessel, a cover for said casing, the casing being open at the bottom and lugs extended inwardly from the casing at the bottom, the lower surfaces of said lugs being in a plane with the bottom edge of the casing.

3. In a cooking utensil, a casing adapted to receive the cooking vessel, said casing being open at the bottom, a cover for the casing, a ring secured to the outer side of the casing at the bottom, and lugs extended inwardly from said ring, the bottom of the casing being provided with recesses to receive said lugs.

In testimony that I claim the foregoing as my own I have hereto affixed my signature in the presence of two witnesses.

JAMES FRANCIS FERRY.

Witnesses:
JOHN M. KERNS,
JAS. AHERN.